(12) United States Patent
Ota et al.

(10) Patent No.: US 11,363,053 B2
(45) Date of Patent: Jun. 14, 2022

(54) DEVICE FOR MANAGING UTILIZED SERVICE

(71) Applicant: DATASIGN INC., Tokyo (JP)

(72) Inventors: Yuichi Ota, Tokyo (JP); Kei Ogasawara, Tokyo (JP)

(73) Assignee: DATASIGN INC., Tokyo (JP)

( * ) Notice: Subject to any disclaimer, the term of this patent is extended or adjusted under 35 U.S.C. 154(b) by 260 days.

(21) Appl. No.: 16/608,491

(22) PCT Filed: Apr. 24, 2018

(86) PCT No.: PCT/JP2018/016620
§ 371 (c)(1),
(2) Date: Jan. 23, 2020

(87) PCT Pub. No.: WO2018/199097
PCT Pub. Date: Nov. 1, 2018

(65) Prior Publication Data
US 2020/0220891 A1    Jul. 9, 2020

(30) Foreign Application Priority Data

Apr. 27, 2017 (JP) .............................. JP2017-088550
Aug. 3, 2017 (JP) .............................. JP2017-150441

(51) Int. Cl.
*H04L 29/06* (2006.01)
*H04L 9/40* (2022.01)
(Continued)

(52) U.S. Cl.
CPC .......... *H04L 63/1433* (2013.01); *G06F 21/56* (2013.01); *G06F 21/577* (2013.01);
(Continued)

(58) Field of Classification Search
CPC ............. H04L 63/1433; H04L 63/1475; H04L 63/168; H04L 67/02; G06F 21/56; G06F 21/577
See application file for complete search history.

(56) References Cited

U.S. PATENT DOCUMENTS 8,516,601 B2    8/2013    Goodwin et al.
9,361,631 B2    6/2016    Meyer et al.
(Continued)

FOREIGN PATENT DOCUMENTS

CN      102495988 A  *  6/2012
JP      2013-520719 A    6/2013
(Continued)

OTHER PUBLICATIONS

J. Alves-Foss, J. Song, A. S. Amack, L. Kerr and S. Steiner, "Evaluating the Use of Security Tags in Security Policy Enforcement Mechanisms," 2015 48th Hawaii International Conference on System Sciences, 2015, pp. 5201-5210, doi: 10.1109/HICSS.2015.614. (Year: 2015).*

(Continued)

*Primary Examiner* — Shawnchoy Rahman
(74) *Attorney, Agent, or Firm* — McGinn I.P. Law Group, PLLC

(57) ABSTRACT

A device 1 for managing utilized services, which serves to manage an external service that is utilized when a user website provided by a user server 14 is accessed, is equipped with a CSP tag generation unit 9 for generating a CSP tag, which is a content security policy tag that allows access only to a prescribed domain and is stipulated by the World Wide Web Consortium.

11 Claims, 7 Drawing Sheets

(51) Int. Cl.
  *G06F 21/56* (2013.01)
  *G06F 21/57* (2013.01)
  *H04L 67/02* (2022.01)
(52) U.S. Cl.
  CPC ........ *H04L 63/1475* (2013.01); *H04L 63/168* (2013.01); *H04L 67/02* (2013.01)

(56) References Cited

U.S. PATENT DOCUMENTS

| | | | |
|---|---|---|---|
| 2012/0324582 | A1 | 12/2012 | Park |
| 2015/0007251 | A1* | 1/2015 | Johns ................. H04L 63/168 726/1 |
| 2015/0230149 | A1* | 8/2015 | Callahan ............. H04L 45/04 370/328 |
| 2016/0094575 | A1* | 3/2016 | Shekyan ............. H04L 63/168 726/25 |
| 2016/0323309 | A1* | 11/2016 | Sethi ................. H04L 63/1466 |

FOREIGN PATENT DOCUMENTS

| | | |
|---|---|---|
| WO | 2011/102605 A2 | 8/2011 |
| WO | 2016/053759 A1 | 4/2016 |

OTHER PUBLICATIONS

K. Chung and C. Keum, "Access control management of the cloud service platform," 2014 International Conference on Information and Communication Technology Convergence (ICTC), 2014, pp. 621-625, doi: 10.1109/ICTC.2014.6983231. (Year: 2014).*

Y. Sun, "Access control method based on multi-level security tag for distributed database system," Proceedings of 2011 International Conference on Electronic & Mechanical Engineering and Information Technology, 2011, pp. 2509-2512, doi: 10.1109/EMEIT.2011.6023609. (Year: 2011).*

Xiang Pan et al: "CSPAutoGen", Computer and Communications Security, ACM, 2 Penn Plaza, Suite 701 New York NY 10121-0701 USA, Oct. 24, 2016, (Oct. 24, 2016), pp. 653-665, XP058280126, DOI: 10.1145/2976749.2978384 ISBN: 978-1-4503-4139-4.

Doliere Francis Some et al: "Control What You Include! Server-Side Protection against Third Party Web Tracking", arxiv.org, Cornell University Library, 201 Olin Library Cornell University Ithaca, NY 14853, Mar. 22, 2017 (Mar. 22, 2017), XP080758875,* abstract *, * pp. 1,7-p. 12 *.

Extended European Search Report dated Nov. 24, 2020 from related EP 18790108.7.

Translation of the International Preliminary Report on Patentability together with the Written Opinion dated Nov. 7, 2019 from related PCT/JP2018/016620.

Japanese Office Action dated Jun. 27, 2017 received from the Japanese Patent Office in related application Japanese Patent Application No. 2017-088550 together with English translation.

International Search Report dated May 29, 2018 received in International Application No. PCT/JP2018/016620, together with an English-language translation.

* cited by examiner

EXTERNAL SERVICE DATABASE

| DOMAIN | PATH | SERVICE NAME | SERVICE TYPE |
|---|---|---|---|
| www.*.* | /*/*.** | * * * * | ADVERTISEMENT |
| www.*.* | /*/*.** | * * * * | ACCESS ANALYSIS |

DEVICE FOR MANAGING UTILIZED SERVICE

TECHNICAL FIELD

The present invention relates to a utilized service management device for managing external services which are utilized when a website is accessed.

BACKGROUND ART

In recent years, an advertising method called targeted advertising has been widely used to deliver advertising over the Internet. There are various targeted advertising methods and it is known that some methods are performed by, e.g., storing an attribute, etc., of a website visited by a user in a cookie in the user browser and delivering advertisements related to matters of interest to the user based on the information in the cookie.

Patent Literature 1 (U.S. Pat. No. 9,361,631) and Patent Literature 2 (U.S. Pat. No. 8,516,601) are the prior art documents related to the invention of the present application.

CITATION LIST

Patent Literatures

Patent Literature 1: U.S. Pat. No. 9,361,631
Patent Literature 2: U.S. Pat. No. 8,516,601

SUMMARY OF INVENTION

Technical Problem

In case of the targeted advertising mentioned above, information about the website such as visit history is sent to a third party such as advertising company (hereinafter, service provided by third party such as advertising company is referred to as "external service"). For this reason, there is an increasing demand to block unwanted external services.

Meanwhile, in recent years, redirection, etc., is used in targeted advertising methods which are thus becoming complicated. Therefore, in some cases, even website administrators are not aware of which external services are utilized when own websites are accessed. Conventionally, individual users generally manage external services by using the browser function (opt-out, etc.). However, for the reasons mentioned above, there is such a demand that website administrators want to collectively manage (restrict) accessible external services on their own.

Therefore, it is an object of the invention to provide a utilized service management device which allows website administrators to collectively restrict accessible external services.

Solution to Problem

To solve the problem mentioned above, the invention provides a utilized service management device for managing an external service that is utilized when a user website provided by a user server is accessed, the device comprising: a CSP tag generation unit for generating a CSP tag comprising a tag of content security policy that allows access to only a prescribed domain and is defined by the World Wide Web Consortium, wherein the CSP tag generation unit is installed in a utilized service management server different from the user server, comprises a reception unit for receiving, from a user who manages the user server, an external service desired to be blocked, and is configured to generate content security policy to inhibit access to a domain of the external service desired to be blocked that is received by the reception unit, the device further comprising: an external request extraction unit that accesses the user website and extracts an URL providing access to a domain other than that of the user website; an external service database storing a domain, a path and a service name of each external service that are associated with each other; and a utilized service identification unit that refers to the external service database and identifies a service name corresponding to a domain and a path of the URL extracted by the external request extraction unit, wherein the reception unit is configured to be capable of providing a management web page on which external services to be blocked or allowed can be selected from a list of the service names identified by the utilized service identification unit.

Advantageous Effects of Invention

According to of the invention, it is possible to provide a utilized service management device which allows website administrators to collectively restrict accessible external services.

DESCRIPTION OF EMBODIMENT

Embodiment

An embodiment of the invention will be described below in conjunction with the appended drawings.

Figure 1:
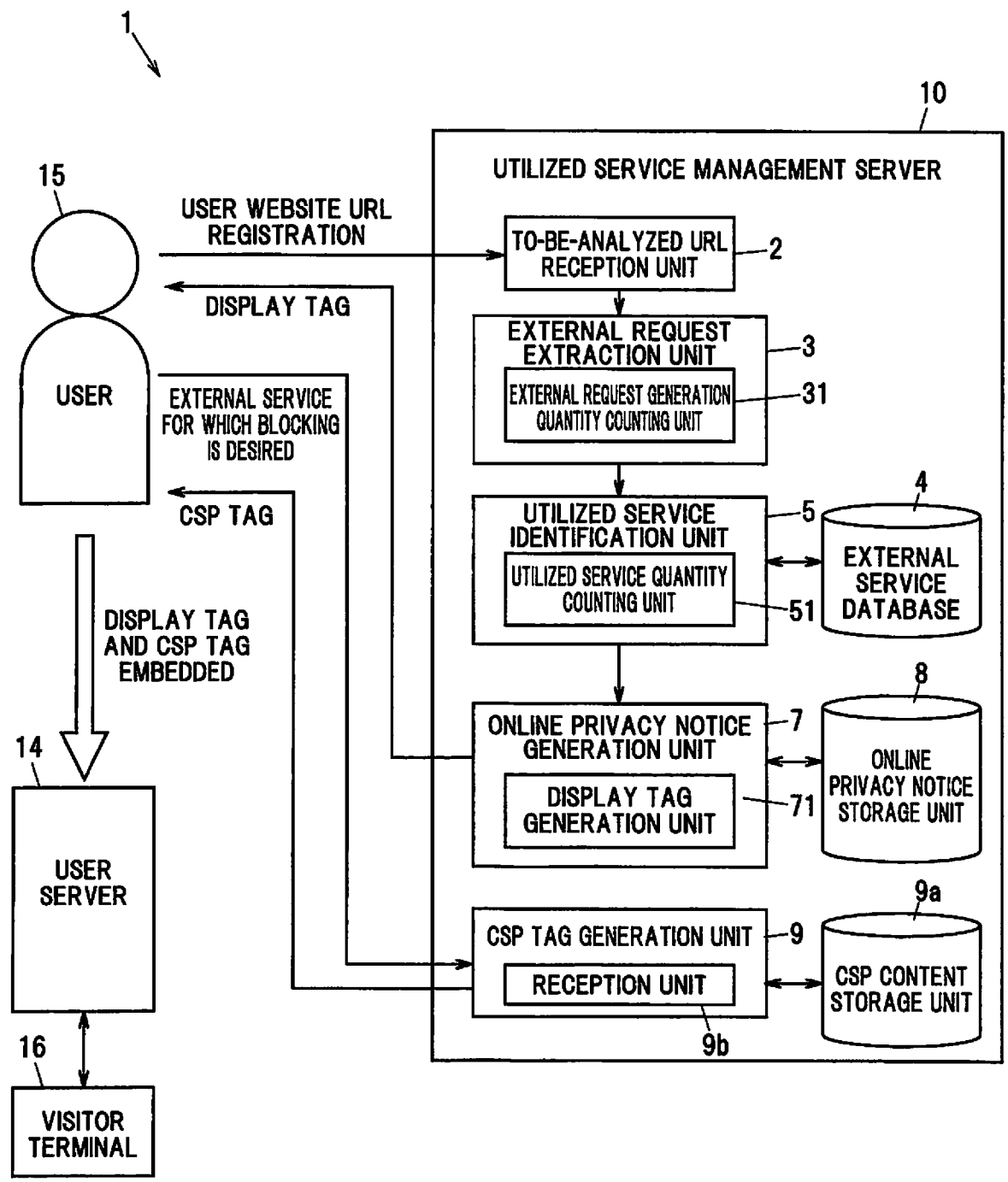
FIG. 1 is a schematic configuration diagram illustrating a utilized service management device in an embodiment of the present invention.

FIG. 1 is a schematic configuration diagram illustrating a utilized service management device 1 in the present embodiment. The utilized service management device 1 has a function of identifying external services accessible from a predetermined website and generating online privacy notice, and a function of inhibiting access to specific external services (blocking the external services). The external services here are, e.g., advertisement, analytics such as access analysis, data collection, web tool and interaction, etc.

Configuration for Generating Online Privacy Notice

Firstly, a configuration for generating online privacy notice will be described. As shown in FIG. 1, the utilized service management device 1 is provided with a to-be-analyzed URL reception unit 2, an external request extraction unit 3, an external service database (external service DB) 4, a utilized service identification unit 5, an online privacy notice generation unit 7, and an online privacy notice storage unit 8. The to-be-analyzed URL reception unit 2, the external request extraction unit 3, the external service database 4, the utilized service identification unit 5, the online privacy notice generation unit 7 and the online privacy notice storage unit 8 are installed in a utilized service management server 10 and are realized by appropriately combining CPU (Central Processing Unit), RAM (Random Access Memory) and ROM (Read Only Memory) which are semiconductor memories, HDD (Hard Disk Drive), software and interface, etc.

The utilized service management device 1 is configured to identify external services accessible from a registered website, to generate an online privacy notice applicable to the website, and to send the generated online privacy notice to a visitor of the website. In this embodiment, a user website hosted on a user server 14 is registered, as an example. The user server 14 and the utilized service management server 10 are different servers.

The to-be-analyzed URL reception unit 2 receives a to-be-analyzed URL, i.e., the URL of the user website. In the present embodiment, a predetermined URL is assigned to the utilized service management server 10 which thus can host a website (referred to as utilized service management website) which can be accessed via the Internet. When using the utilized service management device 1, a user 15 who manages the user server 14 uses a terminal device such as personal computer to access the utilized service management website hosted on the utilized service management server 10 and registers (inputs and sends) the URL of the user website (the website for which online privacy notice is desired to be generated) hosted on the user server 14. The URL of the user website registered via the utilized service management website is received as a to-be-analyzed URL by the to-be-analyzed URL reception unit 2. However, the method of sending the URL of the user website from the user 15 to the utilized service management server 10 (the to-be-analyzed URL reception unit 2) is not limited thereto.

The external request extraction unit 3 accesses the to-be-analyzed URL (in this example, the URL of the user website) received by the to-be-analyzed URL reception unit 2 and extracts URLs providing access to domains other than that of the to-be-analyzed URL. In more detail, the external request extraction unit 3 activates an Internet browser and accesses the user server 14 which hosts the user website. The external request extraction unit 3 also monitors HTTP requests sent after accessing the user server 14 and extracts accessible URLs from the HTTP request messages. Furthermore, the external request extraction unit 3 eliminates the URLs with the same domain as the user website from the extracted URLs. This results in identifying the URLs of external service providing servers 13 which are accessible from the to-be-analyzed URL. Hereinafter, a request for access to a domain other than that of the user website is referred to as "external request". The URL contained in the extracted external request is stored in a predetermined storage area in a memory of the utilized service management server 10.

URLs contained in the HTML source received from the user server 14 could be extracted for the purpose of extracting the URLs of the external requests. In this case, however, if, e.g., the script of the external service contains statements to use still another external service, it is not possible to extract such other external service. In the present embodiment, by monitoring the sent HTTP request messages, it is also possible to extract other external services used in the extracted external service.

In addition, the external request extraction unit 3 has an external request generation quantity counting unit 31 which counts the number of generated external requests (hereinafter, referred to as "external request generation quantity"). The external request generation quantity counted by the external request generation quantity counting unit 31 is stored in a predetermined storage area in the memory of the utilized service management server 10.

Figures 2, 3:
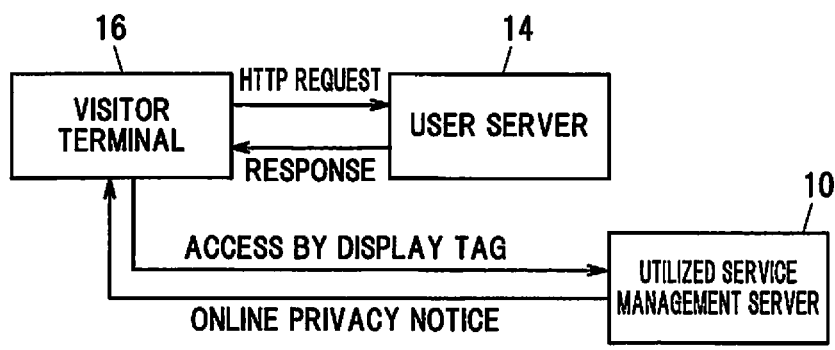
FIG. 2 is a diagram illustrating an example of external service database.
FIG. 3 is an explanatory diagram illustrating a procedure to display online privacy notice on a visitor terminal device.

As shown in FIG. 2, the external service database 4 stores information of external services in which a domain, a path, a service name and a service type are associated with each other, and the external service database 4 is preliminarily stored in a predetermined storage area in the memory of the utilized service management server 10. URL is generally a combination of scheme, domain, path, parameter and fragment. Of those, the path and onward (the path, parameters and fragments) are expressed as a regular expression in the external service database 4. In addition, the service name means the name of external service such as advertising service or access analysis service, and the service type means the type of service such as advertising or access analysis. In the present embodiment, service providers of external services (names of companies providing external services) are also stored in the external service database 4, even though it is not shown in FIG. 2.

The utilized service identification unit 5 refers to the external service database 4 and identifies the service name, the service type and the service provider (hereinafter, referred to as "the service name, etc.") which correspond to the domain and path of the URL contained in the external request extracted by the external request extraction unit 3. The utilized service identification unit 5 stores the identified service name, etc. in a predetermined storage area in the memory of the utilized service management server 10.

When the service name, etc. corresponding to the domain and path of the URL contained in the external request are not found in the external service database 4, the utilized service identification unit 5 indicates that the service name, etc., are "being searched". The utilized service identification unit 5 may be configured that when there is an external request containing an URL of which service name, etc., are unknown, the URL of such an external request is notified to an administrator who manages the utilized service management device 1.

In addition, the utilized service identification unit 5 has a utilized service quantity counting unit 51 which counts the number of utilized external services. The number of utilized external services counted by the utilized service quantity counting unit 51 is stored in a predetermined storage area in the memory of the utilized service management server 10.

The online privacy notice generation unit 7 stores the service name, etc., identified by the utilized service identification unit 5, as an online privacy notice, in the online privacy notice storage unit 8.

The online privacy notice generation unit 7 has a display tag generation unit 71 which generates a display tag for displaying the online privacy notice on the user website. The display tag generation unit 71 sends the generated display tag to the user 15 (a personal computer, etc., of the user 15). The received display tag is embedded in the HTML of the user website and uploaded to the user server 14 by the user 15, thereby allowing the online privacy notice to be displayed. The display tag contains a script code and causes access to the utilized service management server 10 and acquisition/display of the online privacy notice when a visitor visits the user website.

As shown in FIG. 3, when a visitor visits the user website, a visitor terminal 16 sends an HTTP request to the user server 14 which in return sends HTML data with the embedded display tag. The visitor terminal 16 reads and runs the HTML data and, at this time, the embedded display tag causes the visitor terminal 16 to access the utilized service management server 10 and to request the utilized service management server 10 to send an online privacy notice. In response to the request from the visitor terminal 16, the online privacy notice generation unit 7 of the utilized service management server 10 extracts the online privacy notice stored in the online privacy notice storage unit 8 and sends the extracted online privacy notice to the visitor terminal 16. As a result, the online privacy notice of the user website (a list of the service names, etc., of external services accessible from the user website) is displayed on the visitor terminal 16.

In the meantime, external services accessible from the website are not necessarily always the same and may be increased or decreased or may be changed to other external services. Therefore, it is desirable to update the online privacy notice every prescribed period (e.g., every several days). In other words, it is more desirable that the online privacy notice generation unit 7 is configured to make the external request extraction unit 3 and the utilized service identification unit 5 repeatedly identify the service name, etc., and to update the online privacy notice every prescribed period.

Figure 4A:
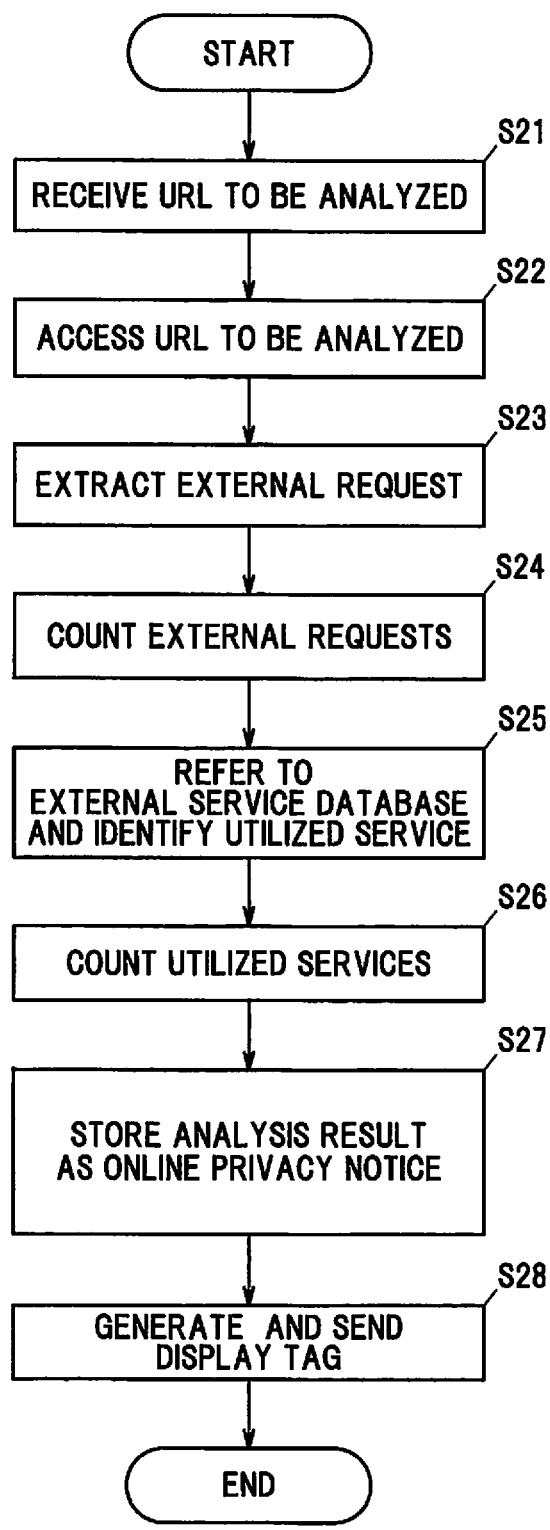
FIG. 4A is a control flow for generating an online privacy notice in the utilized service management device of FIG. 1.
Figure 4B:
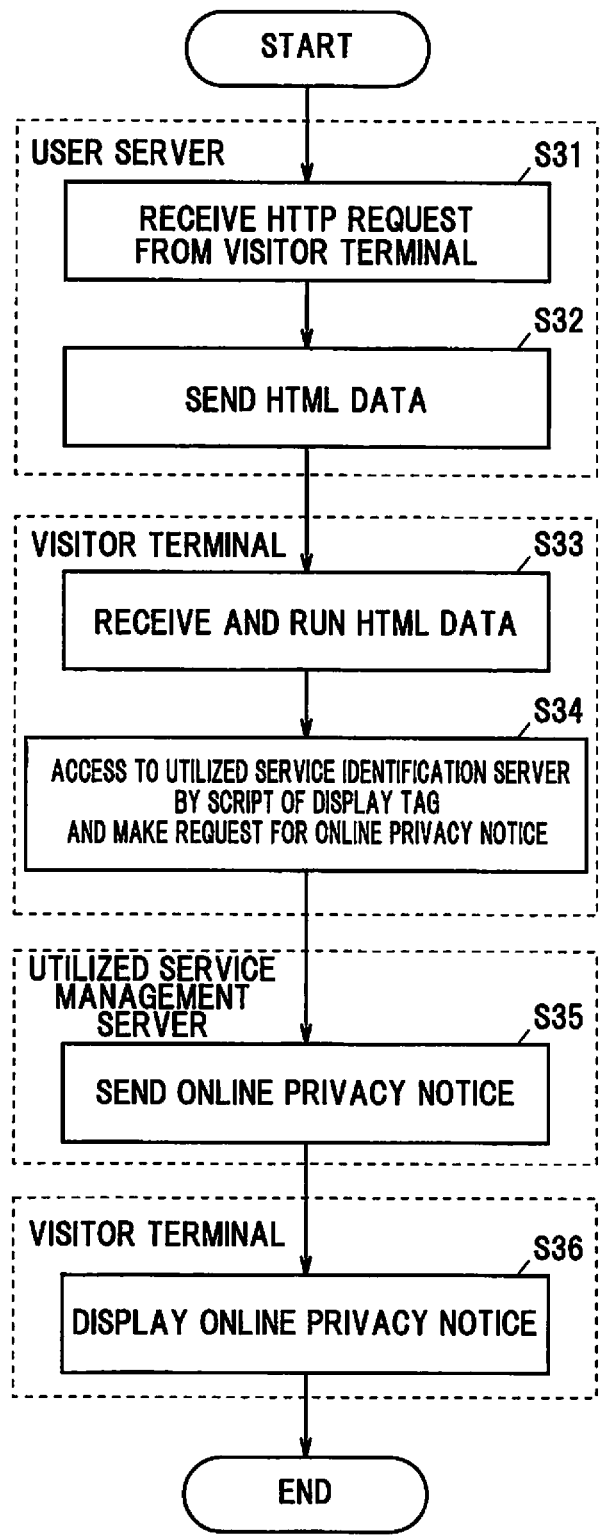
FIG. 4B is a diagram illustrating an operational flow of a utilized service management server, a user server and a visitor terminal device when displaying the online privacy notice on the visitor terminal device.

FIG. 4A is a control flow for generating an online privacy notice in the utilized service management device 1 of FIG. 1, and FIG. 4B is a diagram illustrating an operational flow of the utilized service management server 10, the user server 14 and the visitor terminal 16 when displaying the online privacy notice on the visitor terminal 16.

As shown in FIG. 4A, the utilized service management device 1 receives the user website URL as a to-be-analyzed URL in Step S21. After that, the external request extraction unit 3 activates the Internet browser and accesses the to-be-analyzed URL (the user website URL) in Step S22, and the external request extraction unit 3 extracts the URLs contained in the external requests in Step S23. Then, the external request generation quantity counting unit 31 counts the external request generation quantity in Step S24 and the process proceeds to Step S25. In Step S25, the utilized service identification unit 5 refers to the external service database 4 and identifies the service names, etc. corresponding to the URLs of the external requests extracted by the external request extraction unit 3. After that, the utilized service quantity counting unit 51 counts the number of utilized external services in Step S26, and the process proceeds to Step S27.

In Step S27, the online privacy notice generation unit 7 stores the analysis results, which includes the service names, etc., identified in Step S25, the external request generation quantity counted in Step S24 and the number of utilized external services counted in Step S26, as an online privacy notice in the online privacy notice storage unit 8. Then, in Step S28, the display tag generation unit 71 generates a display tag for displaying the online privacy notice on the user website and sends the generated display tag to the user 15. In this state, the online privacy notice for the user website is prepared in the utilized service management server 10, and the online privacy notice can be displayed once the received display tag is embedded in the HTML of the user website and uploaded to the user server 14 by the user 15.

As shown in FIG. 4B, for access to the user website from the visitor terminal 16, firstly, the user server 14 receives an HTTP request from the visitor terminal 16 in Step S31. In response to the request, the user server 14, which received the HTTP request, sends HTML data with the embedded display tag in Step S32. After that, the visitor terminal 16 receives and runs the HTML data in Step S33. Then, the script of the display tag causes the visitor terminal 16 to access the utilized service management server 10 and to request the utilized service management server 10 for online privacy notice in Step S34. Then, in Step S35, the utilized service management server 10, which received the request for online privacy notice, sends the online privacy notice to the visitor terminal 16. After that, in Step S36, the visitor terminal 16, which received the online privacy notice, displays the received online privacy notice on the user website in accordance with the script of the display tag.

Configuration for Inhibiting Access to Specific External Services

Next, a configuration for inhibiting specific external services will be described.

Back to FIG. 1, to inhibit access to specific external services, the utilized service management device 1 is provided with a CSP tag generation unit 9 which generates a tag of Content Security Policy which allows access to only predetermined domains and is defined by the World Wide Web Consortium (W3C) (hereinafter, referred to as "CSP tag").

CSP is essentially designed to detect and mitigate cross-site scripting attacks, etc., but in the present embodiment, the features of CSP which can restrict domains with permission for content acquisition are used to block specific external services.

The CSP tag generation unit 9 is installed in the utilized service management server 10 different from the user server 14 and is realized by appropriately combining CPU, RAM and ROM which are semiconductor memories, HDD, software and interface, etc.

The CSP tag generation unit 9 has a reception unit 9b which receives external services for which blocking is desired (hereinafter, referred to as "external service desired to be blocked") from the user 15 (from the personal computer, etc., of the user 15). The CSP tag generation unit 9 is configured to generate CSP which inhibits access to the domains of the external services desired to be blocked which are received by the reception unit 9b. "CSP which inhibits access to the domains of the external services desired to be blocked" here means CSP in which the domains of the external services desired to be blocked are excluded from the domains to which the access is allowed.

In the present embodiment, the CSP tag generation unit 9 generates a CSP tag containing a script code by which CSP inhibiting access to a domain of an external service desired to be blocked is added to the user website, and the CSP tag generation unit 9 sends the generated CSP tag to the user 15 (to the personal computer, etc., of the user 15). The user 15 embeds the received CSP tag in the head of the HTML of the user website and uploads it to user server 14.

In the present embodiment, the CSP tag generation unit 9 is also configured to store a CSP content (including detailed description of CSP such as domains, etc., with permission for content acquisition) in the CSP content storage unit 9a and sends the CSP content to the visitor terminal 16 in response to the request from the visitor terminal 16 made by the CSP tag. In this configuration, the domains with permission for content acquisition can be changed only by updating the CSP content within the utilized service management server 10. This allows the user 15 to save time and effort to change and upload the HTML of the user website, thereby improving convenience.

The method of receiving the external service desired to be blocked from the user 15 (from the personal computer, etc., of the user 15) is not specifically limited. For example, a management page dedicated for the user 15 may be provided on the web page so that external services with access permission (or external services with no access permission) can be selected on the management page. In this case, the reception unit 9b of the CSP tag generation unit 9 is configured to be capable of providing an management web page on which external services to be blocked or allowed can be selected from a list of service names identified by the utilized service identification unit 5 (or from the online privacy notice stored in the online privacy notice storage unit 8), and the reception unit 9b is also configured to be capable of receiving the contents selected on the management web page. Then, according to the contents selected on the management web page, the CSP tag generation unit 9 generates or updates the CSP content stored in the CSP content storage unit 9a.

When the CSP content is updated, the utilized external services are also changed. Therefore, it is more desirable that the CSP tag generation unit 9 is configured to make the external request extraction unit 3 and the utilized service identification unit 5 repeatedly identify the service name, etc., so that the online privacy notice is updated when the CSP content is changed.

Figure 5:
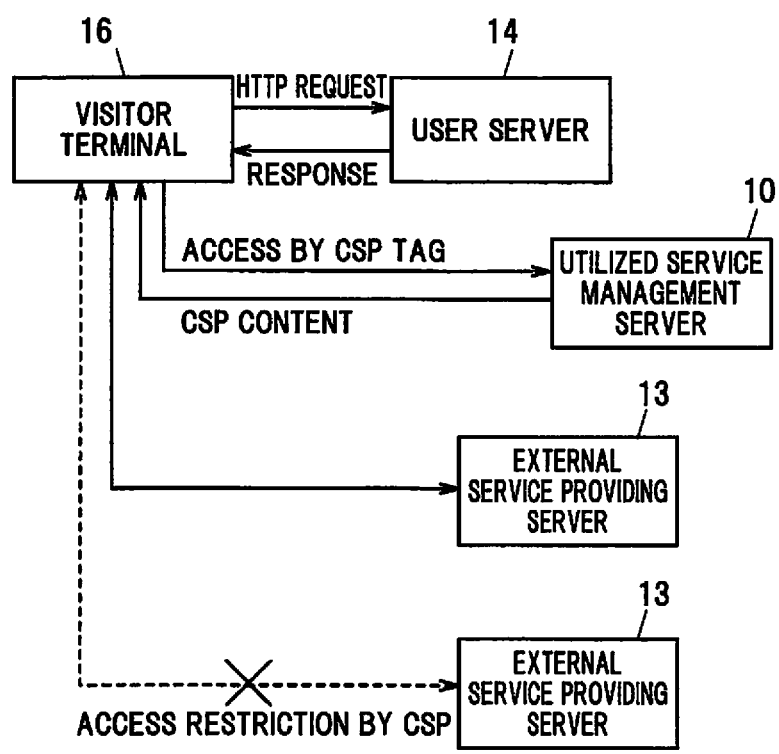
FIG. 5 is an explanatory diagram illustrating a procedure to block an external service.

As shown in FIG. 5, when a visitor visits the user website, the visitor terminal 16 sends an HTTP request to the user server 14 which in return sends HTML data with the embedded CSP tag. The visitor terminal 16 reads and runs the HTML data and, at this time, the embedded CSP tag causes the visitor terminal 16 to access the utilized service management server 10 and to request the utilized service management server 10 to send the CSP content. In response to the request from the visitor terminal 16, the CSP tag generation unit 9 of the utilized service management server 10 sends the CSP content stored in the CSP content storage unit 9a to the visitor terminal 16. As a result, CSP is applied to the visitor terminal 16, and access to a specific external service providing server 13 from the visitor terminal 16 is inhibited in accordance with the CSP content. Thus, an external service hosted on the external service providing server 13 with no access permission is blocked.

Figure 6A:
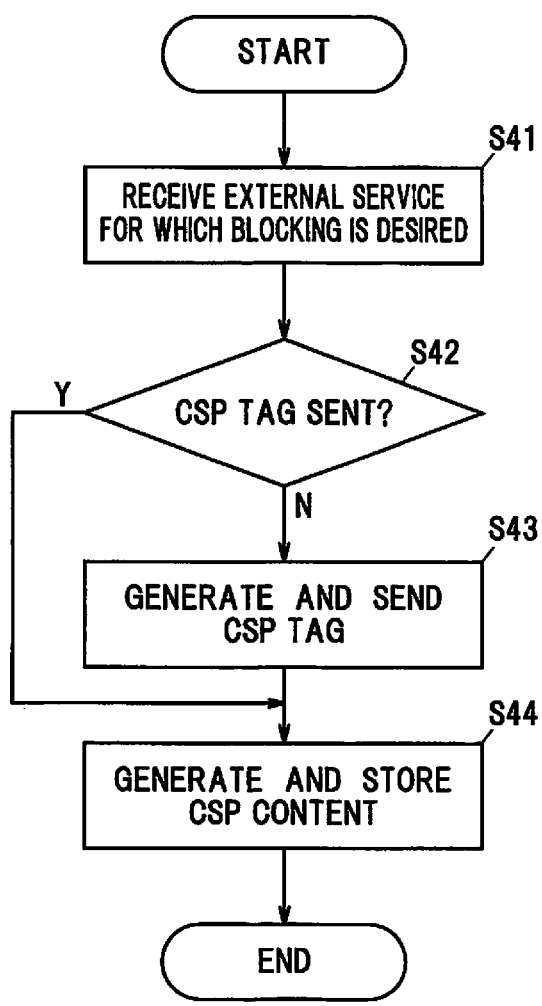
FIG. 6A is a control flow for generating or updating a CSP tag by the CSP tag generation unit.
Figure 6B:
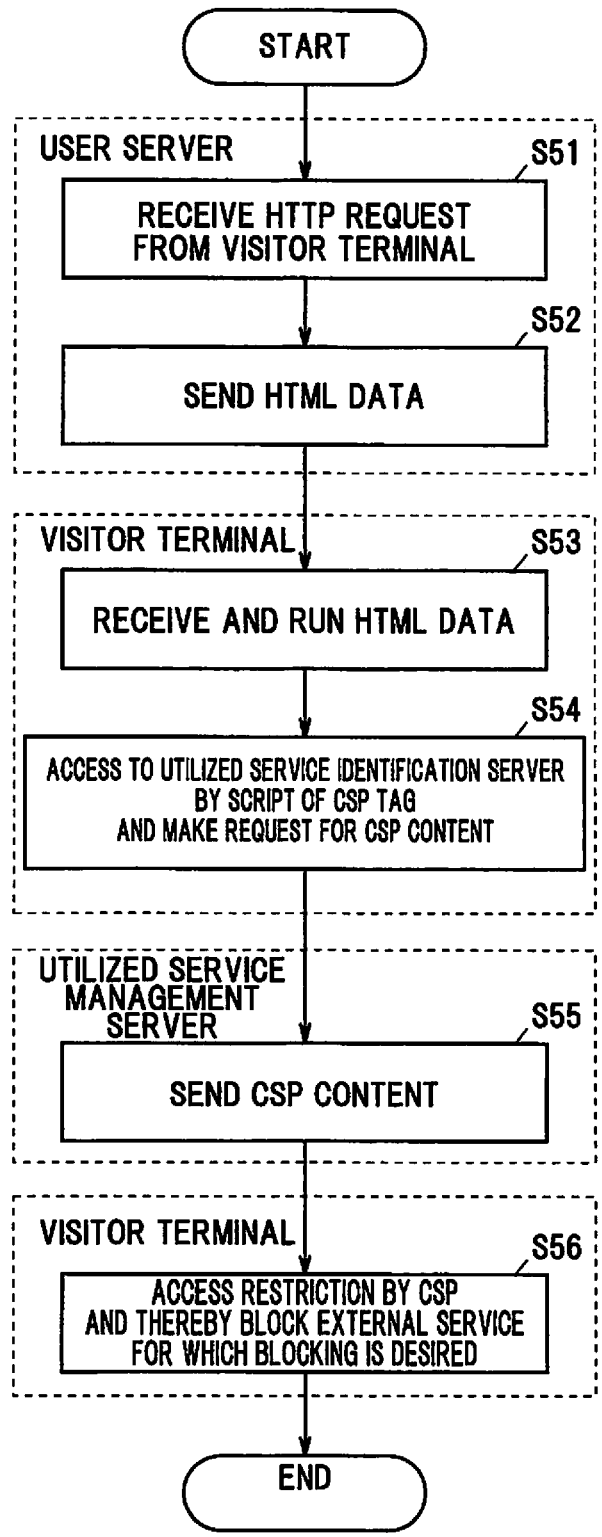
FIG. 6B is a diagram illustrating an operational flow of the utilized service management server, the user server and the visitor terminal device when applying CSP to the visitor terminal device.

FIG. 6A is a control flow for generating or updating the CSP tag by the CSP tag generation unit 9, and FIG. 6B is a diagram illustrating an operational flow of the utilized service management server 10, the user server 14 and the visitor terminal 16 when applying CSP to the visitor terminal 16.

As shown in FIG. 6A, the CSP tag generation unit 9 firstly receives, from the user 15 and via the reception unit 9b, an external service desired to be blocked in Step S41, and determines whether a CSP tag has been sent to the user 15 in Step S42. When already sent, the process proceeds to Step S44. When not sent, a CSP tag is generated and sent to the user 15 in Step S43. In Step S44, the CSP content for inhibiting access to the domain of the external service desired to be blocked which is received in Step S41 is generated and stored (or updated) in the CSP content storage unit 9a. In this state, the CSP content for the user website is prepared in the utilized service management server 10, and blocking of the external service by CSP can be executed once the received CSP tag is embedded in the HTML of the user website and uploaded to the user server 14 by the user 15.

As shown in FIG. 6B, for access to the user website from the visitor terminal 16, firstly, the user server 14 receives an HTTP request from the visitor terminal 16 in Step S51. In response to the request, the user server 14, which received the HTTP request, sends HTML data with the embedded CSP tag in Step S52. After that, the visitor terminal 16 receives and runs the HTML data in Step S53. Then, the script of the CSP tag causes the visitor terminal 16 to access the utilized service management server 10 and to request the utilized service management server 10 for the CSP content in Step S54. Then, in Step S55, the utilized service management server 10, which received the request for CSP content, sends the CSP content to the visitor terminal 16. After that, in Step S56, CSP is applied to the visitor terminal 16 which received the CSP content and the external service desired to be blocked is blocked based on access restriction by CSP.

Functions and Effects of the Embodiment

As described above, the utilized service management device 1 is provided with the CSP tag generation unit 9 which generates a CSP tag for inhibiting access to the domain of a specific external service. This allows a website administrator (the user 15) to collectively restrict accessible external services, and it is possible to block a predetermined external service by simple work of embedding the generated CSP tag in HTML.

In the present embodiment, the user 15 blocks the external service desired to be blocked. However, it is not limited thereto. The CSP tag generation unit 9 may be configured to have a whitelist of domains of safe external services and to generate CSP giving permission to access only the domains listed on the whitelist. In this case, the function of identifying utilized external services is not essential. Hence, the to-be-analyzed URL reception unit 2, the external request extraction unit 3, the external service database 4, the utilized service identification unit 5, the online privacy notice generation unit 7 and the online privacy notice storage unit 8, which provide a specific configuration to realize such function, can be omitted.

In addition, in the utilized service management device 1, the CSP tag generation unit 9 is configured to store the generated CSP content in the CSP content storage unit 9a in the utilized service management server 10 and the CSP tag contains a script code to cause access to the utilized service management server 10 and to add the CSP content stored in the CSP content storage unit 9a to the user website. Due to this configuration, the external services desired to be blocked can be changed only by updating the CSP content within the utilized service management server 10. This allows the user 15 to save time and effort to change and upload the HTML of the user website, thereby improving convenience.

Furthermore, the utilized service management device 1 is further provided with the external request extraction unit 3 which accesses the user website and extracts URLs providing access to domains other than that of the user website, the external service database 4 storing the external services so that the domain, path service name are associated with each other, and the utilized service identification unit 5 which refers to the external service database 4 and identifies the service name corresponding to the domain and path of the URL extracted by the external request extraction unit 3, and the reception unit 9b is configured to be capable of providing a management web page on which external services to be blocked or allowed can be selected from a list of service names identified by the utilized service identification unit 5.

Thus, the website administrator (the user 15) can be aware of external services accessible from his/her own website and can easily select external services which are desired to be blocked, and it is thereby possible to improve convenience. In addition, whether or not the external services desired to be blocked are actually blocked can be easily checked on the management website.

Only by displaying the domain and path of the external service, it is hard to known what kind of service is offered and it is difficult for the user 15 to instinctively understand about the utilized external service. However, by identifying the service name, etc., as does the utilized service management device 1, the user 15 can instinctively understand about the utilized external service.

Although the CSP content is stored within the utilized service management server 10 in the present embodiment, it is not limited thereto and the CSP content may be contained in the CSP tag. In this case, blocking of unwanted external services by CSP can be executed once the received CSP tag is embedded as a meta tag in the HTML of the user website and uploaded by the user 15. In this case, however, the user 15 needs to reupload the CSP content for each change to the CSP content, i.e., for each time the external service with access permission is changed.

Invention Included in the Embodiment

The following technical ideas are included in the embodiment described above. (1) A utilized service management device (1) for managing external services that are utilized when a user website provided by a user server (14) is accessed, the utilized service management device (1) comprising: a CSP tag generation unit (9) for generating a CSP tag comprising a tag of content security policy that allows access to only a prescribed domain and is defined by the World Wide Web Consortium, wherein the CSP tag generation unit (9) is installed in a utilized service management server (10) different from the user server (14), comprises a reception unit (9b) for receiving, from a user who manages the user server (15), an external service desired to be blocked, and is configured to generate content security policy to inhibit access to a domain of the external service desired to be blocked that is received by the reception unit (9b), the CSP tag generation unit (9) is also configured to store the content of the generated content security policy in a CSP content storage unit (9a) within the utilized service management server (10), the CSP tag is embedded in the head of HTML of the user website and comprises a script code to cause a visitor terminal (16) to access the utilized service management server (10) and to add the content of the content security policy stored in the CSP content storage unit (10a) to the user website when the HTML of the user website is executed in the visitor terminal (16) which visits the user website.

Although the embodiment of the invention has been described above, the embodiment is merely an example and the invention according to claims is not to be limited thereto. These new embodiments may be implemented in various other forms, and various omissions, substitutions and changes, etc., can be made without departing from the gist of the invention. In addition, all combinations of the features described in the embodiment are not necessary to solve the problem of the invention. Further, these embodiments are included within the scope and gist of the invention and also within the invention described in the claims and the equivalency thereof.

REFERENCE SIGNS LIST

1: utilized service management device
2: to-be-analyzed URL reception unit
3: external request extraction unit
31: external request generation quantity counting unit
4: external service database
5: utilized service identification unit
51: utilized service quantity counting unit
7: online privacy notice generation unit
71: display tag generation unit
8: online privacy notice storage unit
9: CSP tag generation unit
9a: CSP content storage unit
9b: reception unit
10: utilized service management server
11: user terminal
12: server to be analyzed
13: external service providing server
14: user server
15: user
16: visitor terminal

The invention claimed is:

1. A utilized service management device for managing an external service that is utilized when a user website provided by a user server is accessed, the device comprising:
a Content Security Policy (CSP) tag generation unit for generating a Content Security Policy (CSP) tag comprising a tag of content security policy that allows access to only a prescribed domain and is defined by the World Wide Web Consortium,
wherein the CSP tag generation unit is installed in a utilized service management server different from the user server, comprises a reception unit for receiving, from a user who manages the user server, an external service desired to be blocked, and is configured to generate content security policy to inhibit access to a domain of the external service desired to be blocked that is received by the reception unit,
the device further comprising:
an external request extraction unit that accesses the user website and extracts a Uniform Resource Locator (URL) providing access to a domain other than that of the user website;
an external service database storing a domain, a path and a service name of each external service that are associated with each other; and
a utilized service identification unit that refers to the external service database and identifies a service name corresponding to a domain and a path of the URL extracted by the external request extraction unit,
wherein the reception unit is configured to provide a management web page on which external services to be blocked or allowed can be selected from a list of the service names identified by the utilized service identification unit,
wherein the CSP tag is embedded in a head of a HyperText Markup Language (HTML) of the user website, and
wherein the CSP tag includes a script code to cause a visitor terminal to access the utilized service management server and to add the content of the content security policy stored in the CSP content storage unit to the user website when the HTML of the user website is executed in the visitor terminal which visits the user website.

2. The utilized service management device according to claim 1, wherein the CSP tag generation unit is configured to store a content of the generated content security policy in a Content Security Policy (CSP) content storage unit within the utilized service identification unit, and
wherein the CSP tag comprises a script code to causes an access to the utilized service management server and to add the content of the content security policy stored in the CSP content storage unit to the user website.

3. The utilized service management device according to claim 1, further comprising:
an online privacy notice storage unit; and
an online privacy notice generation unit configure to store the service name as an online privacy notice in the online privacy notice storage unit.

4. The utilized service management device according to claim 3, wherein the reception unit is configured to provide a management web page on which external services to be blocked or allowed can be selected from the online privacy notice.

5. The utilized service management device according to claim 3, wherein the CSP tag generation unit is configured to make the external request extraction unit and the utilized service identification unit repeatedly identify the service name.

6. The utilized service management device according to claim 3, wherein the CSP tag generation unit is configured to make the external request extraction unit and the utilized service identification unit repeatedly identify the service name such that the online privacy notice is updated when the CSP tag is changed.

7. The utilized service management device according to claim 4, wherein the CSP tag generation unit is configured to make the external request extraction unit and the utilized service identification unit repeatedly identify the service name.

8. The utilized service management device according to claim 4, wherein the CSP tag generation unit is configured to make the external request extraction unit and the utilized service identification unit repeatedly identify the service name such that the online privacy notice is updated when the CSP tag is changed.

9. The utilized service management device according to claim 1, wherein the service name is stored as an online privacy notice,
wherein the reception unit is configured to provide a management web page on which external services to be blocked or allowed can be selected from the online privacy notice, and
wherein the online privacy notice is updated when the tag of content security policy is changed.

10. A utilized service management device for managing an external service that is utilized when a user website provided by a user server is accessed, the device comprising:
a processor; and
a memory, the memory storing instructions to cause the processor to perform;
generating a Content Security Policy (CSP) tag comprising a tag of content security policy that allows access to only a prescribed domain and is defined by the World Wide Web Consortium,
wherein the generating occurs in a utilized service management server different from the user server, and receives from a user who manages the user server, an external service desired to be blocked, and further generates content security policy to inhibit access to a domain of the external service desired to be blocked that is received,
the memory further storing instructions to cause the processor to perform:
accessing the user website and extracting an URL providing access to a domain other than that of the user website;
storing a domain, a path and a service name of each external service that are associated with each other; and
referring to the external service database to identify a service name corresponding to a domain and a path of the URL extracted by the extracting,
wherein a management web page is provided on which external services to be blocked or allowed can be selected from a list of the service names identified,
wherein the CSP tag is embedded in a head of a HyperText Markup Language (HTML) of the user website, and
wherein the CSP tag includes a script code to cause a visitor terminal to access the utilized service management server and to add the content of the content security policy stored in the CSP content storage unit to the user website when the HTML of the user website is executed in the visitor terminal which visits the user website.

11. The utilized service management device according to claim 10, wherein the service name is stored as an online privacy notice,
wherein a management web page is provided on which external services to be blocked or allowed can be selected from the online privacy notice, and
wherein the online privacy notice is updated when the tag of content security policy is changed.

* * * * *